United States Patent [19]
Gobbi et al.

[11] Patent Number: 4,787,092
[45] Date of Patent: Nov. 22, 1988

[54] LASER UTILIZING A NEGATIVE BRANCH INSTABLE CAVITY RESONATOR

[75] Inventors: Pier G. Gobbi; Giancarlo Reali, both of Pavia, Italy

[73] Assignee: Quanta System S.R.L., Italy

[21] Appl. No.: 161,412

[22] Filed: Feb. 23, 1988

Related U.S. Application Data

[63] Continuation of Ser. No. 801,045, Nov. 22, 1985.

[30] Foreign Application Priority Data

Nov. 30, 1984 [IT] Italy ............................... 40110 A/84

[51] Int. Cl.$^4$ ............................................. H01S 3/08
[52] U.S. Cl. ........................................ 372/95; 372/103; 372/108; 372/98
[58] Field of Search ............. 372/95, 103, 12, 92, 372/108, 98

[56] References Cited

U.S. PATENT DOCUMENTS

| | | | |
|---|---|---|---|
| 4,019,156 | 4/1977 | Fountain | 372/12 |
| 4,267,524 | 6/1981 | Paxton et al. | 372/95 |
| 4,276,519 | 6/1981 | Marteau | 372/103 |
| 4,429,400 | 1/1984 | Kaye | 372/103 |

OTHER PUBLICATIONS

34 Brown, "Unstable, Q-Switched, Ruby Resonator in the Negative Branch Confocal Configuration", Opt. Comm. vol. 27, No. 2, Nov. 1978.
Ewanizky et al., "Negative-Branch Unstable Resonator Nd:YAG Laser", Appl. Opt. vol. 15, No. 6, Jun. 1976.
Gobbi et al., "Novel Unstable Resonator Configuration with a Self-Filtering Aperture: Experiment Characteriz. of the Nd:YAG Loaded Cavity", Appl. Opt. vol. 24, No. 1, Jan. 1, 1985.

*Primary Examiner*—Léon Scott, Jr.
*Attorney, Agent, or Firm*—Darby & Darby

[57] ABSTRACT

The invention relates to a laser utilizing a negative branch unstable cavity resonator, comprising two opposed and aligned reflecting mirrors and a baffle aligned with the optic axis of the cavity and located in close proximity to the effective focal point of at least one of the mirrors as determined by the influence of the cavity's remaining optical components. The baffle is provided with an aperture of size such as to stop down the focal spot at its first minimum level of luminous intensity from center. The laser beam, which is out-coupled by conventional techniques, possesses optimum intensity-distribution spatial characteristics in space, and can be focused almost to the diffraction limits.

15 Claims, 1 Drawing Sheet

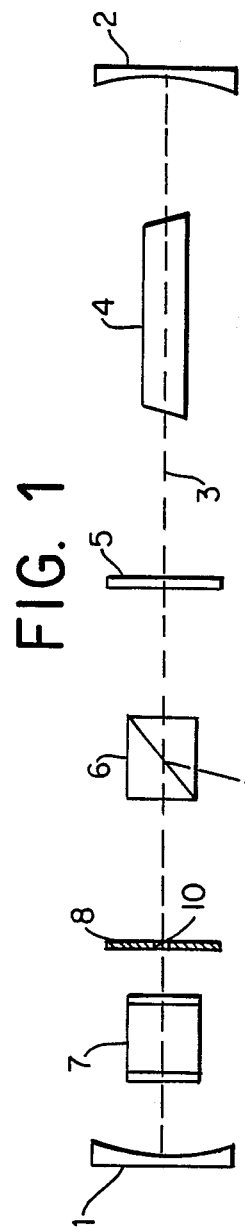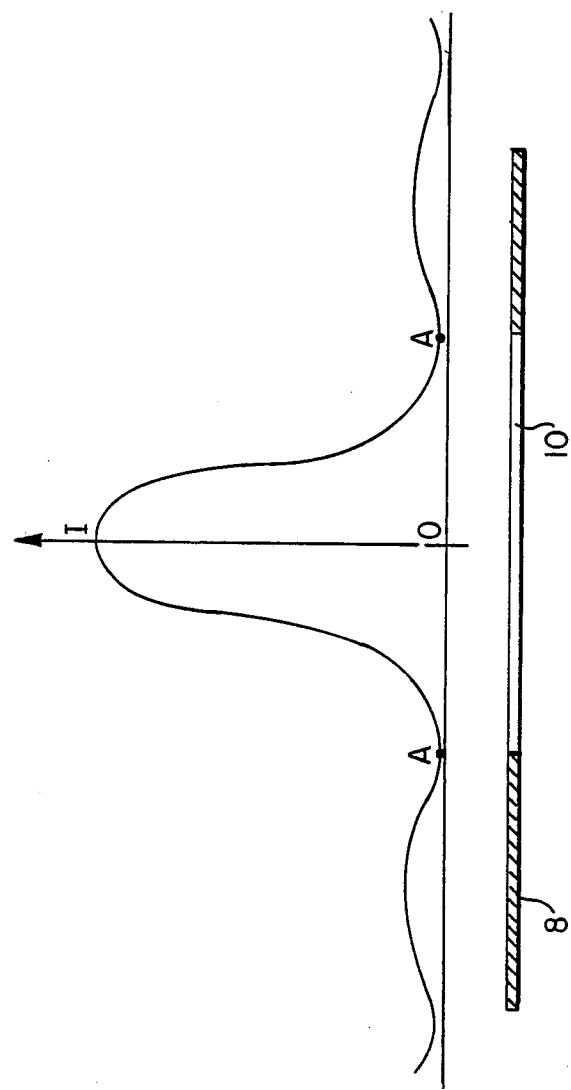

LASER UTILIZING A NEGATIVE BRANCH INSTABLE CAVITY RESONATOR

This is a continuation, of application Ser. No. 801,045, filed Nov. 22, 1985.

BACKGROUND OF THE INVENTION

The invention relates to a laser utilizing a negative branch type unstable cavity resonator, and is especially suitable for high energy applications.

In essence, the prior art embraces two main designs of cavity resonator utilized for high energy laser oscillation systems in conjunction with high gain active laser media (as used, for instance, with Nd:YAG or $CO_2$ sources).

In a first design, use is made of a conventional stable resonator having one concave mirror and one flat mirror, in which a system of lenses is located.

The lenses together form a an inverse telescope the function of which is to increase the transverse dimension of the laser beam in one of the two subsections of the resonator (these being created in effect by embodiment of the telescope) in which the active laser medium is located.

The beam may be out-coupled by way of one of the mirrors, which would be partially transmitting to admit the passage of laser radiation.

In a resonator of this type, there is a risk of damage to the optics in the smaller section of the resonator, where the laser beam gets its smaller dimension, and the alignment of the resonator becomes critical by reason of the inclusion of two extra optical components.

In a second design of high energy laser resonator, use is made of a positive branch unstable cavity. The most common embodiment of such a cavity resonator consists of two mirrors, one convex and one concave, aligned frontally along an optic axis and confocally disposed.

There are several methods of embodying this basic design, methods which differ mainly in the different techniques adopted for out-coupling the laser beam.

Whatever the particular out-coupling technique is ultimately adopted, the essential feature of the positive branch unstable cavity resonator is that the field of radiation within the cavity always stays, during repeated reflection between the two mirrors, in 'near field' conditions. This gives rise to the disadvantage that the beam is respectively chipped by cavity apertures at not negligible intensity levels.

The result is that diffraction fringes of a certain amplitude develop, and the intensity profile of the beam does not appear uniform, but modulated at high spatial frequency. An operating characteristic such as this leads to poor performance in terms of propagation and focusing of the laser beam.

The use of negative branch type unstable cavity resonators in high energy laser emission has not been widespread thus far by reason of the difficulties encountered in eliminating hazards connected with focusing of the laser beam on a focal point located within the cavity resonator. Given the high intensity of a focused laser beam, deterioration or destruction of one or more optical components may result, and in any case, there may be serious limitations imposed on performance of the laser in terms of output.

The object of the invention is that of overcoming the disadvantages and shortcomings described above.

SUMMARY OF THE INVENTION

The stated object, and other besides, are realized in the disclosure, the subject of which is a laser utilizing a negative branch type unstable cavity resonator, comprising at least two aligned and opposed reflecting mirrors, at least one active laser medium located along the optic axis of the resonator and interposed between said mirrors, and means for intercepting and coupling the laser beam emitted from said active laser medium out from the resonator, wherein the effective focal point of at least one of the mirrors (the focusing mirror) as determined by the influence of all the remaining optical components located in the resonator including the other reflective mirror, said laser medium and said beam coupling means, falls within the cavity resonator itself; and wherein a baffle aligned with the optic axis and in close proximity to the effective focal point, is provided with an aperture of size such as to truncate the laser beam emitted by the active laser medium and reflected by the focusing mirror to the first minimum level of its luminous intensity as measured transversely with respect to the optic axis and departing from it.

BRIEF DESCRIPTION OF THE DRAWINGS

The invention will now be described in detail with the aid of the accompanying drawings, in which:

FIG. 1 is a schematic representation of the cavity resonator;

FIG. 2 shows the curve representing luminous intensity of the laser beam at its passage through the baffle located in the area of focus.

DESCRIPTION OF THE PREFERRED EMBODIMENTS

The schematic of FIG. 1 shows a high energy laser using a negative branch unstable cavity resonator comprising two reflecting concave mirrors 1 and 2 located in opposition and aligned with a common optic axis 3. The length of the axis 3 between the two mirrors 1 and 2 is adjustable.

A high gain active laser medium 4 (utilizing Nd:YAG or $CO_2$ for example) is located within the cavity resonator and disposed along the optic axis. The light pump, normally consisting of a flash lamp, is not illustrated in the drawings.

Also located within the cavity resonator and aligned along the optic axis from right to left of the resonator, are a quarter-wave plate 5, a linear polarizer 6, a baffle 8, and a Pockel's cell 7 which performs the function of Q-switch.

The mirror denoted 1 has a shorter focal length than that of the mirror denoted 2, and the mirrors are set apart along the optic axis 3 such that with the remaining optical components 4, 5, 6 and 7 positioned in the cavity, their relative focal points will coincide for practical purposes. At this point of coincidence, or at a point mid-way between the two effective focal points of the mirrors 1 & 2, should these not coincide exactly, one has a baffle 8 located in alignment with the optic axis 3 and provided with an aperture 10, likewise disposed in alignment with the optic axis.

The aperture 10, which will be circular in most instances, is of size such as to stop down the focal spot reflected by the more concave mirror, that is, the mirror denoted 1, at a point of the first minimum level of luminous intensity A as measured transversely with respect to and departing from the optic axis. This first minimum level A of luminous intensity I in the focal spot reflected by the focusing mirror 1 is depicted graphically in FIG. 2, where the Y axis shows luminous intensity, and the X axis illustrates the radial distance of A from the optic axis.

The radius of the aperture 10 is therefore selected such as to match, or to approximate to, the distance from the axis to the first minimum level of luminous intensity in the focal spot; that is, the length of segment OA. A margin of ±20% of the length of OA is permissible in determining the radius of the aperture 10, without there being any substantial deterioration in quality of the laser beam.

The amplitude of segment OA is dependent on the wavelength of laser radiation and on the focal length of the focusing mirror 1. For ratios in excess of 2:1 between the focal length of mirror 2 and the focal length of mirror 1, this amplitude can be calculated to an optimum degree of approximation utilizing the following equation:

$$\overline{OA} = \sqrt{0.61 \cdot f_1 \cdot \lambda}$$

where $\lambda$ is the wavelength of laser radiation, and $f_1$ is the focal length of the focusing mirror 1.

In physical terms, the condition created by location of a baffle 8 at the common focal point of the two mirrors 1 and 2 corresponds to a situation in which the plane wave reflected by mirror-2 and incident on the aperture 10 is first stopped down, then reflected and focused by mirror-1 back onto the plane of the aperture 10 such that the radial distance from the center to the first minimum level of luminous intensity coincides with the radius of the aperture itself.

The immediate result of such a configuration is that the focal spot has substantially the same dimension in either path of propagation, along the optic axis of the cavity resonator, a fact which is instrumental in eliminating high intensity of the laser beam, and with it, the hazard of damage; what is more, inclusion of the aperture 10 increases the already high selectivity possessed by a negative branch unstable cavity resonator in filtering transverse modes of a higher order to the point where their oscillation is made practically impossible even in the most hostile of operating conditions.

A further positive feature of the invention is that it is less sensitive to misalignment than a similar positive branch instable cavity resonator having the same volume.

The laser beam can be out-coupled by any one of the conventional techniques, and in particular, by means of polarization utilising a quarter-wave plate 5 and polarizer 6, or, in the event that the aperture 10 having radius OA is located in a flat and fully reflecting mirror, of a "scraper mirror" which would be aligned with the optic axis and suitably angled with respect thereto in such a way as to reflect the outer annular portion of the beam away in a direction other than that of the optic axis.

The quality of laser beam obtained with a negative branch unstable cavity resonator as illustrated will not suffer any appreciable deterioration by shift in the position of the aperture 10 (hence of baffle 8) along the optic axis 3 away from the focal point, as long as such shift remains within 20-30% of the focal length of the focusing mirror 1.

In another embodiment, the concave mirror denoted 2 would be replaced by a flat reflecting mirror in order to obtain emission of a divergent beam from the cavity.

In a further, folded cavity type of embodiment, the optic axis could be arranged in a broken line back configuration by introduction of one or more additional mirrors, in order to achieve greater compactness.

So-called "ring cavity" resonator embodiments are also made possible by looping the optic axis.

The laser beam can be out-coupled from the cavity resonator to advantage by employing apodizing baffles or mirrors rather than those producing an arbitrary stop.

What is claimed:

1. A laser, utilizing a negative branch type unstable cavity resonator comprising at least two aligned and opposed reflecting mirrors, at least one active laser medium located along the optic axis of the resonator and interposed between said mirrors and means for intercepting and coupling a beam emitted from said active laser medium out of the resonator, wherein the effective focal point of at least one of the mirrors, the focusing mirror, as determined by the influence of all the optical components located in the resonator, including the other reflective mirror, said laser medium and said beam coupling means, falls within the cavity resonator itself; and wherein a baffle, aligned with the optic axis in close proximity to said effective focal point, is provided with a pin hole aperture dimensioned so as to stop down the light spot of the laser beam emitted by the active laser medium and reflected by the focusing mirror to thereby provide a first minimum level of its luminous intensity as measured transversely with respect to the optic axis and departing from it and wherein said dimensioning of the pinhole aperture, which effectively limits the intensity level of the laser beam at the effective focal point and produces a smooth intensity and phase beam profile, is calculated applying the formula:

$$D = 2\sqrt{m \cdot f \cdot \lambda}$$

for circular symmetry, side for rectangular symmetry), m equals 0.61 for circular symmetry and 0.5 for rectangular symmetry, f which is the distance of the pinhole aperture from the focusing mirror is also the equivalent focal length of said focusing mirror as determined by the influence of all the optical components located in the resonator, and $\lambda$ is the wavelength of the laser beam emitted by the laser medium.

2. A laser as in claim 1 wherein the mirror opposed to the focusing mirror and aligned therewith on the optic axis of the cavity resonator, is concave.

3. A laser as in claim 2 wherein the two mirrors are positioned reciprocally such that their relative effective focal points, determined by the influence of all the optical components included in the resonator, will be located near to one another; and wherein the baffle is aligned with the optic axis of the resonator and located in close proximity to the two effective focal points.

4. A laser as in claim 3 wherein the two mirrors and the remaining optical components located in the cavity resonator are positioned such that the two effective focal points may coincide; and wherein the baffle is aligned with the optic axis and located in close proximity to the common focal point thus produced.

5. A laser in claim 1 wherein the mirror opposed to the focusing mirror and aligned therewith on the optic axis of the cavity resonator, is flat or convex.

6. A laser as in claim 1 wherein the baffle takes the form of an element opaque to the laser radiation emitted from said laser medium, at the center of which there is an aperture.

7. A laser as in claim 1 wherein the baffle takes the form of a reflecting mirror, at the center of which there is an aperture, aligned and centered in relation to the optic axis of the cavity reasonator so as to allow out-coupling of the laser beam.

8. A laser as in claim 1 wherein the baffle takes the form of a device opaque to laser radiation, at the center of which there is a zone presenting high transmission to the laser radiation, of dimensions approximating to those of the pin-hole aperture, the edge of which permits a progressive transition from opacity to full transmission.

9. A laser as in claim 1 wherein the baffle takes the form of a reflecting mirror, aligned and centered with respect to the optic axis of the cavity resonator, at the center of which a zone exists characterized by high transmission to the laser beam, wherein such central high transmission zone has a progressive and smooth transition from high transmission to high reflectivity, and approximates said aperture.

10. A laser as in claim 9 wherein one or more additional laser-reflecting mirrors are introduced into the cavity resonator in order to steer the optic axis of the resonator and modify the geometry thereof, thereby producing a folded cavity.

11. A laser as in claim 10 wherein at least one of the two mirrors reflects laser radiation only in part, in order to permit out-coupling of the laser beam.

12. A laser as in claim 10 wherein the baffle is a a highly reflective "scrapper mirror having dimensions equal to those of the aperture in order to permit out-coupling of the laser beam from around its edge in annular fashion.

13. A laser as in claim 12 wherein the edge of the reflecting mirror is such as to permit a progressive and smooth transition from high scrapper to full transmission.

14. Laser as in claim 11 wherein at least one of the two mirrors reflects laser radiation only in part, in order to permit out-coupling of the laser beam.

15. A laser as in claim 1 wherein the laser beam is coupled out of the cavity resonator by means of a polarizer aligned with the optic axis, and wherein a further component likewise aligned with the optic axis allows modifying the state of beam polarization.

* * * * *